United States Patent [19]

Okamura et al.

[11] Patent Number: 4,950,701

[45] Date of Patent: Aug. 21, 1990

[54] BONDING METHOD AND ADHESIVE USEFUL FOR THE METHOD

[75] Inventors: Naomi Okamura, Kuki; Hiroshi Aoki, Sugito; Junzo Makino, Omiya; Hajime Yagi, Tokyo; Yasuo Arai, Sugito; Takashi Yamanaka, Chiba, all of

[73] Assignee: Cemedine Company, Ltd., Tokyo, Japan

[21] Appl. No.: 229,458

[22] Filed: Aug. 8, 1988

Related U.S. Application Data

[62] Division of Ser. No. 69,187, Jul. 2, 1987, Pat. No. 4,793,886.

[51] Int. Cl.$^5$ .................... C08K 5/17; C08K 33/00
[52] U.S. Cl. .................... 524/237; 524/267; 524/269; 524/821; 524/860; 528/21
[58] Field of Search ............. 524/821, 237, 267, 269, 524/860; 528/21

[56] References Cited

U.S. PATENT DOCUMENTS 4,229,431 10/1980 Lee, Jr. et al. .................... 524/61
4,657,941 4/1987 Blackwell et al. ................. 523/116

FOREIGN PATENT DOCUMENTS

625778 8/1961 Canada .................... 528/21

Primary Examiner—Joseph L. Schofer
Assistant Examiner—Mark D. Sweet
Attorney, Agent, or Firm—Oblon, Spivak, McClelland, Maier & Neustadt

[57] ABSTRACT

A method for bonding two objects by means of the following two adhesives:

(A) a moisture-inducible room temperature anion polymerization curing adhesive composed essentially of at least one anion polymerizable compound selected from the group consisting of an α-cyanoacrylate compound of the formula:

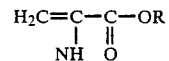

wherein R is an alkyl group having from 1 to 16 carbon atoms, an alkoxyalkyl group having 2 to 16 carbon atoms, a haloalkyl group having from 1 to 16 carbon atoms, a cyanoalkyl group having from 2 to 16 carbon atoms, an aralkyl group having from 6 to 12 atoms, an acyloxyalkyl group having from 2 to 16 carbon atoms, a cycloalkyl group having from 3 to 16 carbon atoms, an alkenyl group having from 2 to 16 carbon atoms or an aryl group having from 6 to 12 carbon atoms, and a 1,1-disubstituted diene compound of the formula:

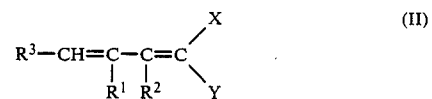

wherein each of $R^1$ and $R^2$ which may be the same or different, is a hydrogen atom, an alkyl group having from 1 to 5 carbon atoms, an aryl group, an aralkyl group having from 6 to 12 carbon atoms or a halogen atom, $R^3$ is a hydrogen atom or a methyl group, each of X and Y which may be the same or different, is a cyano group, a carboxylic acid ester group having from 2 to 12 carbon atoms, an ethylsulfone group, a phenylsulfone group, a formyl group, an acetyl group, a benzoyl group, an amide group, a diethyl sulfonyl group, or a phenyl group; and (B) a room temperature self-curing adhesive containing from 0.05 to 50% by weight of an anion polymerization accelerator, said self-curing adhesive being selected from the group consisting of (1) a room temperature moisture-curing adhesive, (2) a room temperature curing two-part type epoxy resin adhesive, and (3) a room temperature curing synthetic resin aqueous emulsion adhesive, which comprises applying said two adhesives (A) and (B) at the bonding interface of the objects so that they do not contact each other and pressing the objects to each other to bring the two adhesives in contact with each other.

3 Claims, 5 Drawing Sheets

BONDING METHOD AND ADHESIVE USEFUL FOR THE METHOD

This is a division, of application Ser. No. 07/069,187, filed 7/2/87 now U.S. Pat. No. 4,793,886.

BACKGROUND OF THE INVENTION

1. Field of the Invention

The present invention relates to a bonding method whereby objects to be bonded can be fixed (provisionally adhered) in a short period of time without application of any special treatment such as heating, pressing or ultraviolet irradiation, and yet adequate bonding strength is obtainable upon expiration of a certain period of time, and to an adhesive useful for the method.

2. Discussion of Background

Bonding by means of adhesives is commonly employed in various industrial fields and at home. In recent years, requirements for bonding have expanded, and they include not only the bonding properties, but also various other requirements such as non-toxicity, non-flammability, efficiency and simplicity of the bonding operation, reduction of the time required for pressing after joining the objects and bonding properties not restricted to ordinary objects but applicable also to porous or rough surfaced objects. However, no bonding method has been known which satisfies such various requirements at the same time.

For example, adhesives for industrial purposes include an epoxy resin adhesive, a hot melt adhesive, a rubber-solvent type adhesive, a synthetic resin aqueous emulsion adhesive, a two-part type acrylic adhesive, an α-cyanoacrylate adhesive, a two-part type urethane adhesive and an ultraviolet curing adhesive. They are used as excellent adhesives for bonding objects in various fields, for example, in the fields of paper packagings, electrical parts, precision machinery, building and construction, and household utensils. However, these adhesives have various drawbacks as follows.

Namely, the epoxy resin adhesive is capable of firmly bonding a wide range of objects, and has been used widely as an adhesive for structures or sub-structures. However, it usually requires a heat or a long period of time for curing to obtain adequate strength. It is possible to complete the curing in a short period of time by properly selecting a curing agent. In such a case, however, there will be a drawback that the useful time will be extremely short.

The hot melt adhesive is heated and melted at a high temperature in its use, and thus requires a heat coating apparatus. Further, the adhesive force after the bonding sharply drops when the temperature approaches the softening temperature of the adhesive. Besides, the type of objects to be bonded by this adhesive is rather limited.

The rubber-solvent type adhesive has drawbacks such that after the application of the adhesive, it is necessary to evaporate and remove a substantial amount of the solvent before bonding, and the waiting time is long and it takes a long time for the bonding operation. Besides, there is a danger of catching a fire, toxicity or odor due to the evaporation of the solvent.

The synthetic resin aqueous emulsion adhesive has various advantages such that, as compared with an organic solvent type adhesive, it creates less air pollution, and it is superior in the safety and hygiene and easy to handle, and that it is suitable for conservation of resources. Therefore, it is utilized in a wide range of fields, particularly for the bonding of porous objects such as wood, paper or cloth. However, the aqueous emulsion adhesive has a fatal drawback that the development of the initial adhesive force is extremely slow because of the poor drying property due to the fact that the medium is water.

The two-part type acrylic adhesive cures in a few minutes to exhibit excellent adhesive properties. However, it has a strong odor, and its useful life after mixing is extremely short, and it is not suitable for the bonding of a wide range of objects.

The α-cyanoacrylate adhesive can be cured and bonded at room temperature in a short period of time without requiring heating, mixing or ultraviolet irradiation. However, this adhesive is inferior in the impact adhesive strength and in the peel adhesive strength, and thus is poor in the dependability for the bonding performance. Further, it is inferior in the adhesion to a porous object or to an object having a roughened surface such as wood, cloth or concrete material.

It has been proposed to overcome the above drawbacks by adding various modifiers such as a thickener, a plasticizer or a curing accelerator to the α-cyanoacrylate adhesive. However, fully satisfactory results have not been obtained.

Like the above-mentioned α-cyanoacrylate adhesive, a 1,1-di-substituted diene compound adhesive has an excellent property that it is capable of being cured in a short period of time. However, it has the same drawback as the α-cyanoacrylate adhesive in that it is inferior in the adhesion to a porous object or to a roughened surface.

The two-part urethane adhesive is likely to undergo foaming in the presence moisture or water, whereby the adhesive strength tends to deteriorate, thus leading to defective bonding. Further, it has an additional drawback that it is inferior in the water resistance and in the heat resistance even after curing.

The ultraviolet curing adhesive requires an ultraviolet radiation apparatus, and is applicable only for the bonding of transparent materials.

SUMMARY OF THE INVENTION

In view of the above-mentioned drawbacks of the conventional adhesives and bonding methods, it is an object of the present invention to provide a bonding method whereby after laminating the objects to be bonded, provisional adhesion can be attained in a short period of time without using any other tools, and upon expiration of a certain period of time after the lamination, adequate bonding properties, particularly adequate peel adhesive strength and impact adhesive strength, can be obtained.

It is another object of the present invention to provide a bonding method whereby adequate bonding properties can be provided not only to ordinary objects but also to porous objects or objects having a roughened surface, so that the method is applicable to the bonding of a wide range of objects.

A further object of the present invention is to provide an adhesive useful for such a bonding method.

The present inventors have conducted extensive research to solve the above-mentioned problems, and have found that the above-mentioned objects can easily be attained by using a combination of two adhesives i.e. a certain specific room temperature anion polymerization curable adhesive and a certain specific room tem- perature self-curing adhesive containing an anion polymerization accelerator, and by applying the two adhesives at the bonding interface of the objects to be bonded so that the two adhesives do not contact each other and then pressing the objects to each other to bring the two adhesives in contact with each other.

Namely, the present invention provides a method for bonding two objects by means of the following two adhesives:

(A) a moisture-inducible room temperature anion polymerization curing adhesive composed essentially of at least one anion polymerizable compound selected from the group consisting of an α-cyanoacrylate compound of the formula:

wherein R is an alkyl group having from 1 to 16 carbon atoms, an alkoxyalkyl group having 2 to 16 carbon atoms, a haloalkyl group having from 1 to 16 carbon atoms, a cyanoalkyl group having from 2 to 16 carbon atoms, an aralkyl group having from 6 to 12 carbon atoms, an acyloxyalkyl group having from 2 to 16 carbon atoms, a cycloalkyl group having from 3 to 16 carbon atoms, an alkenyl group having from 2 to 16 carbon atoms or an aryl group having from 6 to 12 carbon atoms, and a 1,1-disubstituted diene compound of the formula:

wherein each of $R^1$ and $R^2$ which may be the same or different, is a hydrogen atom, an alkyl group having from 1 to 5 carbon atoms, an aryl group, an aralkyl group having from 6 to 12 carbon atoms or a halogen atom, $R^3$ is a hydrogen atom or a methyl group, each of X and Y which may be the same or different, is a cyano group, a carboxylic acid ester group having from 2 to 12 carbon atoms, an ethylsulfone group, a phenylsulfone group, a formyl group, an acetyl group, a benzoyl group, an amide group, a diethyl sulfonyl group, or a phenyl group; and (B) a room temperature self-curing adhesive containing from 0.05 to 50% by weight of an anion polymerization accelerator, said self-curing adhesive being selected from the group consisting of (1) a room temperature moisture-curing adhesive, (2) a room temperature curing two-part type epoxy resin adhesive, and (3) a room temperature curing synthetic resin aqueous emulsion adhesive, which comprises applying said two adhesives (A) and (B) at the bonding interface of the objects so that they do not contact each other and pressing the objects to each other to bring the two adhesives in contact with each other.

According to the bonding method of the present invention, the anion polymerization accelerator is incorporated in the room temperature self-curing adhesive (B) as opposed to a conventional method in which an anion polymerization accelerator is incorporated in a room temperature anion polymerization curing adhesive (A). The reason is that if the anion polymerization accelerator is incorporated in the room temperature anion polymerization curing adhesive (A), the storage stability of the adhesive tends to deteriorate, or the useful life of the adhesive tends to be shortened, whereas when it is incorporated in the room temperature self-curing adhesive, no such a deterioration will be brought about. Further, it has been unexpectedly found that when the bonding method of the present invention is applied, the setting time (the time for provisional adhesion) can be shortened more effectively in the case where the anion polymerization accelerator is incorporated in the room temperature self-curing adhesive (B) than in the case where the same accelerator is added to the anion polymerization curing adhesive (A). When the bonding method of the present invention is applied, the anion polymerization accelerator incorporated in the room temperature self-curing adhesive (B) will penetrate and diffuse into the room temperature anion polymerization curing adhesive (A) and reacts therewith to facilitate the polymerization curing of the adhesive (A), thus providing a quick provisional adhesive effect.

DETAILED DESCRIPTION OF THE PREFERRED EMBODIMENTS

The α-cyanoacrylate compound of the formula I to be used for the adhesive (A) in the method of the present invention, includes, for example, methyl α-cyanoacrylate, ethyl α-cyanoacrylate, propyl αc-cyanoacrylate, butyl α-cyanoacrylate, 2-methoxymethyl α-cyanoacrylate, 2-methoxyethyl α-cyanoacrylate, 2-ethoxymethyl α-cyanoacrylate, 2-ethoxyethyl α-cyanoacrylate, 2-propoxyethyl α-cyanoacrylate, 2-protoxyethyl α-cyanoacrylate, tetrahydrofurfuryl α-cyanoacrylate, allyl α-cyanoacrylate, propargyl α-cyanoacrylate, 2-chloroethyl α-cyanoacrylate and 2-(2,2,2-trifluoroethoxy)ethyl α-cyanoacrylate. Particularly preferred among them, is ethyl α-cyanoacrylate, ethyl a-cyanoacrylate, propyl α-cyanoacrylate or a mixture thereof.

The 1,1-di-substituted diene compound of the formula II to be used for the adhesive (A) in the method of the present invention, includes, for example, 1-cyano-1-carbomethoxybutadiene-1,3,
1-cyano-1-carboethoxybutadiene-1,3,
1-cyano-1-carbo-n-propoxybutadiene-1,3, and
1,1-dicarboethoxybutadiene-1,3.

For the preparation of the adhesive (A) to be used in the method of the present invention, only one member selected from the group consisting of the α-cyanoacrylate compound of the formula I and the 1,1-di-substituted diene compound of the formula II may be used, or two or more different members may be selected and used in combination as a mixture. Further, there may be added to the adhesive (A), $SO_2$, a carboxylic acid, a phosphoric acid, a sulphonic acid; a storage stabilizer such as hydroquinone or hydroquinone mono-methyl ether; a thickener such as acrylic rubber, an acrylate (co)polymer, a polyester or a polyurethane; a geling agent (such as a geling agent as disclosed in Japanese Unexamined Patent publication No. 107993/1979); a plasticizer such as a phthalic acid ester or a phosphoric acid; a coloring agent, a curing accelerator (such as a lactone compound, a silacrown compound or a crown compound), or an organic solvent, in an amount not to substantially impair the bonding properties.

The room temperature self-curing adhesive (B) includes a room temperature moisture-curing adhesive (B)-1, a room temperature curing two-part type epoxy resin adhesive (B)-2, and a room temperature curing synthetic resin aqueous emulsion adhesive (B)-3.

The room temperature moisture-curing adhesive (B)-1 is preferably composed essentially of a polyisocyanate compound having in its molecule at least two isocyanate groups, or an organic silicon compound having in its molecule at least two-silicon atoms having a hydrolyzable group attached thereto.

The organic isocyanate compound having in its molecule at least two isocyanate groups, includes an isocyanate terminal polyurethane obtained by the reaction of an organic polyhydroxyl compound with an organic polyisocyanate, and an isocyanate terminal polyurethane obtained by the reaction of an organic polythiol compound with an organic polyisocyanate.

The organic polyhydroxyl compound as the starting material, includes, for example, the following compounds:

(a) a lactone polyol and its alkylene oxide adduct;
(b) a polyester polyol and its alkyne oxide adduct;
(c) a polyoxyalkylene polyol, a polyoxycycloalkylene polyol and their alkylene oxide adducts;
(d) a polyalkanolamine and its alkylene oxide adducts;
(e) a polyol derived from a polyamine by the addition of an alkylene oxide to the polyamine;
(f) a non-reducing sugar, a sugar derivative and their alkylene oxide adducts;
(g) An alkylene oxide adduct of a three component condensation product of aromatic amine-phenol-aldehyde;
(h) an alkylene oxide adduct of a polyphenol;
(i) a polytetramethylene glycol;
(j) a polyfunctional glyceride such as caster oil;
(k) a polyhydroxy group-containing vinylpolymer;
(l) a polyhydroxy polysulfide polymer;
(m) a hydroxyl-terminal long chain lactone polyester having a molecular weight with in a range of from 5,000 to 75,000, obtained by the reaction of a lactone polyester with a polyol such as bisphenol A and phosgene;
(n) a diene (co)polymer such as a polybutadiene or an acrylonitrile-butadiene copolymer containing hydroxyl groups.

The organic polythiol compound as the starting material includes, for example, a thioglycolate of pentaerythritol, and a mercaptoethyleneadipate. As its commercial products, Thiocol LP-3, Thiocol LP-8 (trade names of the products of Toray-thiocol Company), Epomate QX-10, Epomate QX-11 (trade names of the products of Yuka Shell Epoxy Company Limited), Polythiol DION 3-800LC (trade name of a product of Diamond-Shamrock Company) may be mentioned.

Further, the organic polyisocyanate as the starting material includes, for example, n-phenylene diisocyanate, p-phenylene diisocyanate, 2,4-tolylene diisocyanate, 2,6-tolylene diisocylante, 4,4'-diphenylmethane diisocyanate, benzidine diisocyante, naphthalene-1,5-diisocyanate, hexamethylene diisocyanate, 4,4',4''-triphenylmethane triisocyanate, decamethylene diisocyanate, polyphenylmethylene polyisocyanate (which can be produced by reacting phosgene to an aniline-formaldehyde condensation product), dianisidine diisocyanate, xylene diisocyanate, bis-(2-isocyanatoethyl) fumarate, bis-(2-isocyanatoethyl)-cyclohex-4-ene 1,2-dicarboxylate, bis-(2-isocyanatoethyl) carbonate, and an organic polyisocyanate as disclosed in "Annalen", 562, 22135(1949) by Siefken.

The organic silicon compound having in its molecule at least two reactive silicon functional groups to be used for the adhesive (B)-1 in the method of the present invention, includes a compound having in its molecule at least two reactive silicon functional groups of the formula:

wherein Z is a hydrolyzable group, $R^4$ is a non-hydrolyzable group, and n is an integer of from 0 to 2.

In the above formula III, the hydrolyzable group Z includes, for example, an acyloxy group such as an acetoxy group, an octanoyloxy group or a bezoyloxy group; a ketoxime group such as a dimethylketoxime group, a methyl ethyl ketoxime group or a diethyl ketoxime group; an alkoxy group such as a methoxy group, an ethoxy group or a propoxy group; an alkenyloxy group such as an isopropenyl group or a 1-ethyl-2-methylvinyloxy group; an amino group such as a dimethylamino group, a diethylamino group, a butylamino group or a cyclohexylamino group; an aminoxy group such as a dimethylaminoxy group or a diethylaminoxy group; and an amide group such as an N-methylacetamide group, an N-ethylacetamide group or an N-methylbenzamide group.

In the formula III, the non-hydrolyzable group $R^4$ includes, for example, an alkyl group such as a methyl group, an ethyl group, a propyl group or a butyl group; a cycloalkyl group such as a cyclopentyl group or a cyclohexyl group; an alkenyl group such as a vinyl group or an allyl group; an aryl group such as a phenyl group, a tolyl group or a naphthyl group; an aralkyl group such as a 2-phenylethyl group; an iminoalkyl group such as and these groups, of which a part or all of hydroxyl atoms are substituted by halogen atoms.

The organic silicon compound having in its molecule at least two silicon atoms having a hydrolyzable group attached thereto, includes the following compounds:

(a) a room temperature curing silicon compound obtained by reacting a silane compound having in its molecule a reactive silicon functional group of the formula III to a polydiorganosiloxane having terminal silanol groups;
(b) a room temperature curing silicon terminal compound obtained by reacting a compound having in its molecule a group capable of being reacted with an isocyanate group and a reactive silicon functional group of the formula III, with the same polyisocyanate compound as used as the main component in the above-mentioned adhesive (B)-1 (Japanese Examined Patent Publication No. 30711/1971);

(c) a room temperature curing silicon terminal compound obtained by reacting a compound having in its molecule an isocyanate group and a reactive silicon functional group of the formula III with the same organic polyhydroxyl compound or organic polythiol compound as used as the starting material for the production of the organic polyisocyanate compound as the main component of the above-mentioned adhesive (B)-1;

(d) a silicon-modified polyoxyalkylenepolyether compound obtained by addition-reacting a compound having a reactive silicon functional group of the formula III and a —SH group or hydrogen directly bonded to silicon to a compound having an allyl group at the terminal of the molecule;

(e) other compounds such as a terminal reactive silicon functional group-containing compound as disclosed in e.g. Japanese Examined Patent publication No. 32678/1974.

The room temperature curing two-part type epoxy resin adhesive (B)-2 usually comprises (a) an epoxy resin component composed essentially of an epoxy resin having in its molecule at least two epoxy groups, and (b) an epoxy resin curing agent component, and the two-part type epoxy resin adhesive contains the anion polymerization accelerator in either one or both of the epoxy resin component (a) and the epoxy resin curing agent component (b). The epoxy resin used for the epoxy resin component (a) in the room temperature curing two-part type epoxy resin adhesive, is usually an epoxy resin having in its molecule at least two epoxy resins. For example, those disclosed in e.g. "New Epoxy Resins" compiled by Hiroshi Kakiuchi, Chapters 2 and 3 (published by Shokodo in 1985) may be mentioned.

Specifically, there may be mentioned:

(a) a polyhydric phenol glycidyl ether type epoxy resin, such as a glycidyl ether type epoxy resin of a diphenylol alkane such as 2,2-bis-(4-hydroxyphenyl)propane (so-called bisphenol A), 1,1-bis(4-hydroxyphenyl)ethane (so-called bisphenol AD), or bis(4-hydroxyphenyl)methane (so-called bisphenol F), or a glycidyl ether type epoxy resin derived from a polyhydric phenol, such as a glycidyl ether of 4,4'-dihydroxydiphenylsulfone, hydroquinone, resorcinol, dihydroxydiphenyl or dihydroxynaphthalene, or a glycidyl ether of resol or a novolak as a condensation product of phenol or cresol with formaldehyde;

(b) a poly(epoxyalkyl)ether of an aliphatic polyhydroxyl compound such as a glycidyl ether type epoxy resin derived from e.g. ethylene glycol, glycerol, trimethylolpropane or pentaerythritol;

(c) a polycarboxylic acid polyglycidyl ester type epoxy resin such as a glycidyl ester of phthalic acid, terephthalic acid, adipic acid, tetrahydrophthalic acid or hexahydrophthalic acid;

(d) a polyglycidyl ester type epoxy resin of an unsaturated fatty acid polymer, such as a diglycidyl ester of a dimer of linolenic acid;

(e) an epoxidized ester of an unsaturated acid, such as epoxidized linseed oil or soybean oil;

(f) an epoxidized diene, such as diepoxybutane; and (g) others including an epoxidized vinylcyclohexane, a polyglycidylisocyanurate, diglycidylaniline, a hydantoin type epoxy resin, a urethane-modified epoxy resin, an NBR-modified epoxy resin and a p-oxybenzoic acid glycidyl ether ester type epoxy resin. These epoxy resins may be used alone or in combination of two or more different kinds depending upon the particular purpose. However, the useful epoxy resin is not restricted to the above specific examples, and any conventional epoxy resin may be used. A particularly preferred epoxy resin is a polyhydric phenol glycidyl ether epoxy resin obtained by the reaction of 2,2-bis-(4-hydroxyphenyl)-propane with epichlorohydrin. This is commercially available, for instance, as Epikote 828 (trade name) manufactured by Yuka Shell Epoxy K.K., Araldite GY252 (trade name) manufactured by Ciba Gaigy Company or DER R331 (trade name) manufactured by Daw Chemical Company.

These epoxy resins may be used in the form of a mixture by substituting not more than 30% by weight thereof by a monoepoxy compound to reduce the viscosity of the composition to facilitate the handling. As such a mono epoxy compound, there may be mentioned an epoxy ether such as styrene oxide, phenylglycidyl ether, butylglycidyl ether or allylglycidyl ether; or an epoxy ester such as versatic acid glycidyl ester (e.g. Cardura E manufactured by Shell Epoxy K.K.).

The curing agent component (b) in the two-part type epoxy resin adhesive (B)-2 includes diethylenetriamine, triethylenetetramine, tetraethylenepentamine, trimethylhexamethylenediamine, diethylaminopropylamine, iminobispropylamine, bis(hexamethylene)triamine, 1,3,6-trisaminomethylhexane, trimethylhexamethylenediamine, a polyether diamine such as diethylene glycol bispropylenediamine, an aliphatic polyamine such as N-aminoethylpiperadine or m-xylylenediamine, and a polyamine-ethylene oxide such as a polyamine epoxy resin adduct (a reaction product of an epoxy resin with an excess aliphatic polyamine such as diethylenetriamine), N,N-bis(hydroxyethyl)diethylene-triamine or N,N-bis(hydroxypropyl)diethylenetriamine; a polyamine-propylene oxide adduct, and a cyanoethylated polyamine (an addition product of a polyamine such as diethylenetrimaine or m-xylylenediamine with acrylonitrile; a modified aliphatic polyamine such as ketimine (a reaction product of an aliphatic polyamine such as diethylenetriamine or m-xylylenediamine with a ketone such as methyl ethyl ketone); an alicyclic polyamine such as menthenediamine, isophoronediamine, bis(4-amino-3-methylcyclohexyl)methane or N-aminoethylpiperadine, and their modified products; an aromatic polyamine such as a eutectic mixture of aromatic diamines such as diaminodiphenylmethane, diaminodiphenylsulfone and m-phenylenediamine (various aromatic diamines are liquefied in the form of a eutectic mixture); a modified aromatic polyamine obtained by the reaction with a phenol or a monoepoxy compound; other amine curing agents such as 3,9-bis(3-aminopropyl)-2,4,8,10-tetraspiro[5.5]undecane, and their modified products; a polyamide obtained by the condensation of a dimer acid or a polycarboxylic acid with a polyamine; an amine-modified amide; and a polymercaptane curing agent having in its molecule at least two mercapto (SH) groups. The polymercaptane curing agent includes a polythiol available as Dion 3-800LC (trade name, manufactured by Diamond-Shamrock Company), Epomate QX-10 and QX-11 (trade names, manufactured by Yuka Shell Epoxy K.K.), Thiocol LP-3 and LP-8 (trade names, manufactured by Toraythiocol Company) Adeca Hardner EH317 (trade name, manufactured by Asahi Denka Kogyo K.K.) and a thioglycollic acid polyhydric alcohol ester such as a trimethylolpropane or pentaerythritol ester. These epoxy resin curing agents may be used alone or in combination of two or more different kinds.

The synthetic resin emulsion used for the synthetic resin aqueous emulsion adhesive (B)-3 in the method of the present invention, means a commonly known aqueous dispersion of a polymer. Specifically, it includes an aqueous dispersion of a polymer or a copolymer obtained from one or at least two copolymerlyzable unsaturated monomers selected from the group consisting of vinyl acetate, ethylene, styrene, a styrene derivative, butadiene, acrylonitrile, chloroprene, an acrylic acid ester, a methacrylic acid ester, vinyl chloride and vinylidene chloride, and an aqueous dispersion of a copolymer obtained by copolymerizing the above-mentioned monomer with at least one unsaturated monomer having a hydroxyl group, unsaturated monomer having a carboxyl group or unsaturated monomer having an amide group (such as acrylamide).

Here, the monomer having a hydroxyl group includes allyl alcohol, 2-hydroxyethyl methacrylate, 2-hydroxyethyl acrylate, 2-hydroxypropyl methacrylate, 2-hydroxypropyl acrylate, a polyhydric alcohol monoallyl ether, an N-methylol-modified acrylamide, and an N-methylol methacrylamide. The monomer having a carboxyl group means an unsaturated polymerizable organic acid such as acrylic acid, methacrylic acid, itaconic acid, fumaric acid, crotonic acid, a half ester of maleic acid, a half ester of itaconic acid, a half ester of fumaric acid, or maleic acid.

These synthetic resin emulsions may be used alone in combination of two or more different kinds.

The room temperature self-curing adhesive (B) used in the method of the present invention, contains an anion polymerization accelerator. The anion polymerization accelerator includes a tertiary amine compound, a lactone compound, a silacrown compound, a crown compound, an N,N-dicyclohexylcarbodiimide, succinic acid amide, ethylenethiourea and 1,2,6-hexanetriol.

As the tertiary amine compound, any aliphatic, alicyclic, aromatic-substituted aliphatic or aromatic tertiary amine compound may be employed. Specifically, it includes N,N-dimethylaniline, N,N-diethylaniline, N,N-dimethyl-p-toluidine, N,N-diethyl-p-toluidine, N,N-dimethyl-m-toluidine, N,N-diethyl-m-toluidine, N,N-bis(2-hydroxypropyl)-p-toluidine, N-ethyl-N-methylaniline, N,N-2,4,6-pentamethylaniline, 4-bromo-N,N-dimethylaniline, 4-tert-butyl-N,N-dimethylaniline, N,N-dimethyl-1,4-phenylenediamine, N,N-diethyl-1,4-phenylenediamine, triphenylamine, N,N-dimethylethanolamine, N,N-diethylethanolamine, N-butyldiethanolamine, phenylethylethanolamine, β-dimethylaminoethyl acetate, and β-dimethylaminoethylbenzene.

The tertiary amine compound may be the above-mentioned tertiary amine compound in which a reactive silicon functional group of the above-mentioned formula III is incorporated. For example, (N,N-dimethyl-3-aminopropyl)trimethoxysilane, (N,N-diethyl-3-aminopropyl)trimethoxysilane, (N,N-dipropyl-3-aminopropyl)triethoxysilane, (N,N-dibutyl-3-aminopropyl)-triethoxysilane, (N,N-dimethyl-3-aminopropyl)trimethylsilane, (N,N-diethyl-3-aminobutyl)triethylsilane, N,N-dimethylaminophenyltrimethoxysilane, N,N-dimethylaminophenyltriethoxysilane, N,N-diethylaminophenyltrimethoxysilane, N,N-diethylaminophenyltriethoxysilane and N,N-dimethylaminophenyltrimethylsilane may also be used as the tertiary amine compound for the anion polymerization accelerator.

Further, as the tertiary amine compound, various tertiary amines disclosed in "Handbook of Tables for Organic Compound Identification" vol. 3 (1967) published by the Chemical Rubber Company, p 319–325, may be used.

The lactone compound includes, for example, γ-butylolactone, β-propiolactone, 5-ethyl-γ-butyrolactone, ε-caprolactone and cumarin.

The silacrown compound includes, for example, 1-(3-aminopropyl)-1-methylsila-11-crown-4, 1-vinyl-1-methyl-silacrown-5, 1vinyl-1-methylsilacrown-6, 1,1-dimethylsila-11-crown-4, 1,1-dimethylsila-14-crown-5, 1,1-dimethylsila-17-crown-6 and 1,1-dimethylsila-20-crown-7.

The crown compound includes, for example, 15-crown-5, 18-crown-6, dibenzo-18-crown-6, dibenzo-24-crown-8, dicyclohexyl-18-crown-6, dicyclohexyl-24-crown-8, and disila-15-crown.

The above compounds may be used alone or in combination of two or more different kinds as the anion polymerization accelerator.

The anion polymerization accelerator is added to the adhesive (B)-1 in an amount of from 0.05 to 50% by weight, preferably from 0.5 to 40% by weight, based on the adhesive (B)-1.

In the case of the room temperature curing two-part type epoxy resin adhesive (B)-2, the anion polymerization accelerator may be added either one or both of the epoxy resin component (a) and the epoxy resin curing agent component (b) in an amount of from 0.05 to 50% by weight, preferably from 0.5 to 10% by weight.

In the case of the room temperature curing synthetic resin aqueous emulsion adhesive (B)-3, the anion polymerization accelerator is added in an amount of from 0.05 to 50% by weight, preferably from 0.5 to 10% by weight, based on the solid content in the emulsion.

If the amount of the anion accelerator is too small, it becomes difficult to quickly polymerize and cure the adhesive (A) at the time of the bonding operation, whereby it is difficult to effectively reduce the time required for provisional adhesion. On the other hand, if the amount of the anion polymerization accelerator is excessive, the bonding strength tends to deteriorate.

For the preparation of the adhesive (B)-1 in the method of the present invention, one or more compounds are selected from the above-mentioned organic polyisocyanate compounds and organic silicon compounds. Then, the anion polymerization accelerator is added thereto to obtain the adhesive (B)-1. To the adhesive, there may be incorporated a plasticizer such as a phthalic acid ester; a filler such as calcium carbonate or carbonblack; a curing accelerator such as an organic tin compound; an adhesive property-imparting agent such as a silane compound; a drip preventing agent such as aerosol silica; a water-removing agent such as molecular sieve; and others such as an antioxidant, an ultraviolet absorber or a coloring agent.

In the case of the adhesive (B)-1 wherein an organic polyisocyanate compound is used, a ketimine compound, an enamine compound or an oxazoline compound which is capable of forming a polyamino compound, a polyimino compound or an amino alcohol by hydrolysis, may be used in combination, as disclosed in Japanese Examined Patent Publications No. 12510/1968, No. 16126/1982, No. 20639/1973 and No. 35407/1980 and Japanese Unexamined Patent Publication No. 195177/1985. Further, the organic polyisocyanate compound with its isocyanate group appropriately blocked with a phenol or an oxime, may also be used.

In the case of the adhesive (B)-1 wherein an organic silicon compound is used as the main component, instead of preliminarily reacting the organosiloxane with the silane compound having a reactive silicon functional group of the formula III to form an organic silicon compound before blending, it is possible that the starting material organosiloxane and the reactive silicon functional group-containing silane compound are incorporated as they are, to obtain the adhesive (B)-1.

To the room temperature curing two-part type epoxy resin adhesive (B)-2 in the present invention, other resins compatible with the epoxy resin or the curing agent, for example, a thermosetting resin such as a phenol resin, a styrene resin or a phenoxy resin; a thermoplastic resin such as a polyester resin, an ethylene-vinyl acetate copolymer, an ionomer resin, a modified butadiene-acrylonitrile resin, a vinyl acetate resin, a coal or petroleum residue resin such as coal tar or asphalt pitch, a filler such as calcium carbonate or carbonblack; a curing accelerator such as 2,4,6-tris-(dimethylaminomethyl)-phenol or an organic tin compound; an adhesive property-imparting agent such as a silane compound, a drip preventing agent such as aerosol silica; a water-removing agent such as molecular sieve; others such as an antioxidant, an ultraviolet absorber or a coloring agent, may be incorporated, as the case requires.

To the adhesive (B)-3 in the present invention, a filler such as cray, talc, calcium carbonate, titanium white or zinc white; a film-forming assistant such as butylcarbitol or butylcarbitol acetate; a plasticizer such as dibutyl phthalate or dioctylphthalate; an adhesive property-imparting agent such as rosin, terpenphenol or a petroleum resin; various surfactants to be used for wetting, dispersing or defoaming and various additives such as a thickener, a thixotropic agent or an anti-freezing agent, may be added for various purposes within a range not to impair the effects of the present invention.

The method of the present invention comprises applying the two adhesives (A) and (B) thus prepared, at the bonding interface of the objects to be bonded, so that the two adhesives do not contact each other, and then pressing the objects to each other to bring the two adhesives in contact with each other.

The application of the two adhesives so that they do not contact each other, may be carried out in various modes, as illustrated in FIGS. 1 to 9.

In each of the embodiments of FIGS. 1 to 5, both the adhesives (A) and (B) are applied onto the surface of an object 1 i.e. one of the two objects, so that the two adhesives do not mix or contact with each other, and then the other object 2 is pressed to the object 1 so that the two adhesives will be brought in contact with each other.

Figure 6:
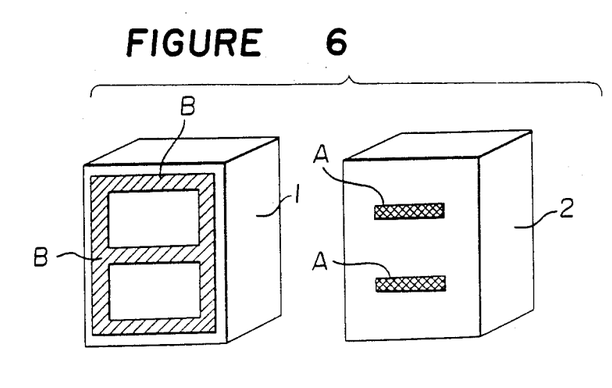
Figure 7:
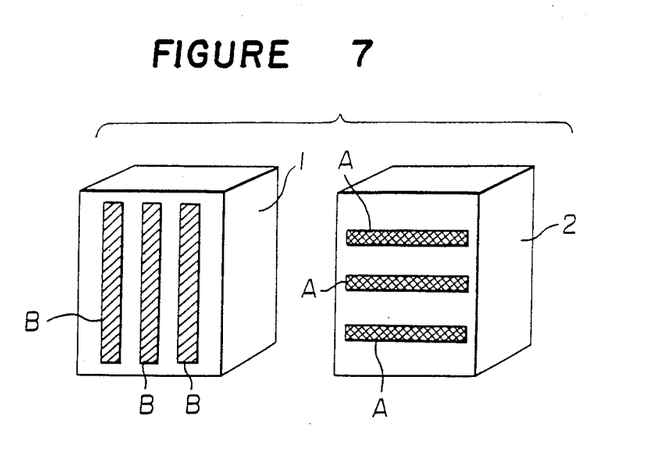
Figure 8:
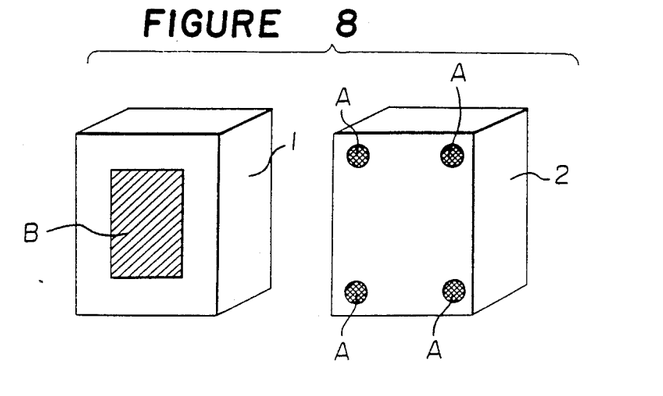

In each of the embodiments illustrated in FIGS. 6 to 8, the adhesives (A) and (B) are separately applied onto the bonding surfaces of the objects 1 and 2, respectively, so that even when the bonding surfaces of the two objects are brought together, the adhesives (A) and (B) do not substantially overlap each other, and then the two objects are pressed to each other to bring the two adhesives in contact with each other.

Figure 9:
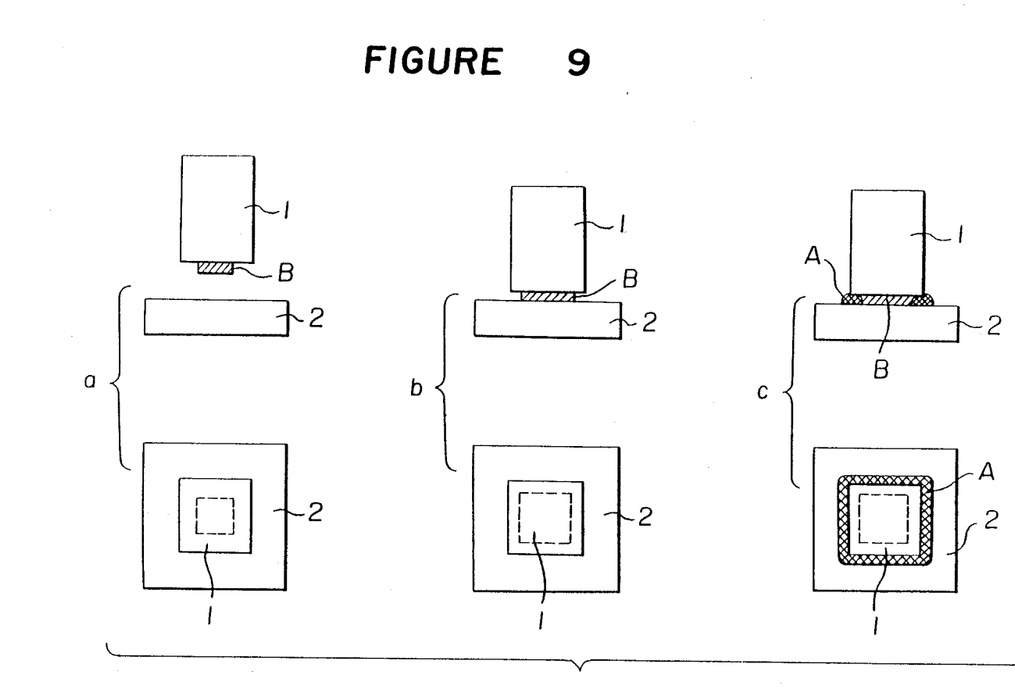

In the embodiment illustrated in FIG. 9, firstly in step a, the adhesive (B) is applied to the lower surface corresponding to the bonding surface of the object 1 within a rather limited area, and then in step b, the object 1 with the adhesive (B) is put on the object 2. Then, in step c, the adhesive (A) is applied to the space around the adhesive (B) at the bonding interface of the objects 1 and 2 to complete the bonding operation.

Now, the present invention will be described in further detail with reference to Adhesive Preparation Examples, and working Examples and Comparative Examples. However, it should be understood that the present invention is by no means restricted to these specific Examples.

In these Examples, "parts" means "parts by weight".
Adhesive Preparation Examples A1 to A6

Various adhesives A1 to A6 were prepared to have various compositions as identified in Table A.

TABLE A

| | | Adhesives | | | | | |
|---|---|---|---|---|---|---|---|
| | | A1 | A2 | A3 | A4 | A5 | A6 |
| Components of Adhesives (parts) | Methyl α-cyano acrylate | 100 | — | — | — | — | — |
| | Ethyl α-cyano-acrylate | — | 100 | — | 30 | 50 | — |
| | Propyl α-cyano-acrylate | — | — | 100 | — | — | — |
| | 2-Methoxy-ethyl α-cyano-acrylate | — | — | — | 70 | — | — |
| | 1-cyano-1-carboxy-butadiene-1,3 | — | — | — | — | 50 | — |
| | Commercially available adhesive 3000 Gold *1 | — | — | — | — | — | 100 |

Note for TABLE A:
*1 Trade name for an ethyl α-cyanoacrylate adhesive, manufactured by Cemedine Co., Ltd.

Adhesive Preparation Examples B1-1 to B1-16

Firstly, base compositions b1 to b5 for the adhesive (B)-1 were prepared to have various compositions as identified in Table b.

TABLE b

| | Base compositions | b1 | b2 | b3 | b4 | b5 |
|---|---|---|---|---|---|---|
| Components of base compositions (parts) | MS Polymer #300 *1 | 100 | 80 | — | — | — |
| | Dimethyl polysiloxane having terminal OH groups | — | 20 | — | 100 | 100 |
| | Vinyltriacetoxysilane | — | — | — | 6 | — |
| | Methyltris (acetoneoxime)silane | — | 1.2 | — | — | 6 |
| | Hycel U-100 *2 | — | — | 75 | — | — |
| | Takenate L-1023 *3 | — | — | 25 | — | — |
| | Aerosil #200 *4 | 4 | 4 | — | 8 | 8 |
| | Dibutyltin dioxide solution *5 | 2 | 2 | — | — | — |
| | Dibutyltin diacetate | — | — | 2 | 0.1 | 0.2 |
| | N-β-(aminoethyl) amionopropyl tri- | 6 | — | — | — | 2 |

TABLE b-continued

| Base compositions | b1 | b2 | b3 | b4 | b5 |
|---|---|---|---|---|---|
| methoxysilane | | | | | |
| γ-Glycidoxy-Propyltrimethoxy silane | 6 | — | — | — | — |
| γ-Isocyanato-propyltrimethyoxy silane | — | 12 | — | — | — |

Notes for Table b:
*1: Trade name for a propyleneoxide polymer having a terminal group of $$(CH_3O)_2SiCH_2CH_2CH_2O-\underset{\underset{CH_3}{|}}{}$$

manufactured by Kanegafuchi Ind. Co., Ltd.
*2: Trade name for a tolylene diisocyanate adduct of a polyether polyol, manufactured by Sanyo Kasei Kogyo K.K.
*3: Trade name for a tolylene diisocyanate adduct of a polyether polyol, manufactured by Takeda Chemical Industries Company Limited.
*4: Trade name for aerosol silica, manufactured by Nippon Aerosol Company.
*5: A solution in an equimolar amount of dioctyl phthalate.

Various base compositions as shown in Table b and various anion polymerization accelerators as identified in Table B1 were combined to prepare adhesives B1-1 to B1-16.

TABLE B1

| | | Adhesives (B)-1 | | | | | | | | |
|---|---|---|---|---|---|---|---|---|---|---|
| | | B1-1 | B1-2 | B1-3 | B1-4 | B1-5 | B1-6 | B1-7 | B1-8 | B1-9 |
| Base composition (parts) | b1 | 95 | 95 | 90 | — | — | — | — | — | — |
| | b2 | — | — | — | 89 | 90 | 60 | — | — | — |
| | b3 | — | — | — | — | — | — | 97 | 97 | — |
| | b4 | — | — | — | — | — | — | — | — | 96 |
| | b5 | — | — | — | — | — | — | — | — | — |
| Anion polymerization accelerator (parts) | N,N-Dimethyl-p-toluidine | 5 | — | — | — | — | — | 2 | — | — |
| | N,N-Diethyl-p-toluidine | — | — | — | — | — | — | — | — | — |
| | N,N-Diethyl aniline | — | 3 | — | — | — | — | 1 | 3 | — |
| | N-Butyl-diethanolamine | — | — | — | 1 | — | — | — | — | — |
| | (N,N-Dimethyl-3-aminopropyl) trimethoxy silane | — | — | — | — | — | — | — | — | 4 |
| | N,N-Dimethyl-animonphenyl trimethoxy silane | — | — | — | — | — | — | — | — | — |
| | ε-Caprolactone | — | — | — | — | — | 40 | — | — | — |
| | 1,1-Dimethylsila-11-crown-4 | — | 2 | — | — | — | — | — | — | — |
| | 1,1-Dimethylsila-14-crown-5 | — | — | — | 10 | — | — | — | — | — |
| | 15-Crown-5 | — | — | 10 | — | — | — | — | — | — |
| | 18-Crown-6 | — | — | — | — | 10 | — | — | — | — |
| | N,N-Dicyclohexylcarbodiimide | — | — | — | — | — | — | — | — | — |
| | Succinic acid amide | — | — | — | — | — | — | — | — | — |
| | Ethylenethiourea | — | — | — | — | — | — | — | — | — |

| | | Adhesives (B)-1 | | | | | | |
|---|---|---|---|---|---|---|---|---|
| | | B1-10 | B1-11 | B1-12 | B1-13 | B1-14 | B1-15* | B1-16* |
| Base composition (parts) | b1 | — | — | — | — | 99.5 | 100 | — |
| | b2 | — | — | — | — | — | — | — |
| | b3 | — | — | — | — | — | — | — |
| | b4 | 95 | — | — | — | — | — | — |
| | b5 | — | 95 | 95 | 85 | — | — | — |
| Anion polymerization accelerator (parts) | N,N-Dimethyl-p-toluidine | — | — | — | — | — | — | — |
| | N,N-Diethyl-p-toluidine | — | — | — | — | 0.5 | — | 100 |
| | N,N-Diethyl aniline | — | — | — | — | — | — | — |
| | N-Butyl-diethanolamine | — | — | — | — | — | — | — |
| | (N,N-Dimethyl-3-aminopropyl) trimethoxy silane | — | — | — | — | — | — | — |
| | N,N-Dimethyl-aminophenyl-trimethoxy silane | 5 | — | — | — | — | — | — |
| | ε-Caprolactone | — | — | — | — | — | — | — |
| | 1,1-Dimethylsila-11-crown-4 | — | — | — | — | — | — | — |
| | 1,1-Dimethylsila- | — | — | — | — | — | — | — |

TABLE B1-continued

| | | | | | | | |
|---|---|---|---|---|---|---|---|
| 14-crown-5 | | | | | | | |
| 15-Crown-5 | — | — | — | — | — | — | — |
| 18-Crown-6 | — | — | — | — | — | — | — |
| N,N-Dicyclo-hexylcarbodiimide | — | 5 | — | — | — | — | — |
| Succinic acid amide | — | — | 5 | — | — | — | — |
| Ethylenethiourea | — | — | — | 15 | — | — | — |

Note for Table B1:
*Comparative Example

Adhesive Preparation Examples B2-1 to B2-15

Room temperature curable two-part epoxy resin adhesives B2-1 to B2-15 having various combinations of Component a and Component b and containing or not containing an anion polymerization accelerator, as identified in Table B2, were prepared.

TABLE B2

| | | Adhesives (B)-2 | | | | | | | | |
|---|---|---|---|---|---|---|---|---|---|---|
| | | B2-1 | B2-2 | B2-3 | B2-4 | B2-5 | B2-6 | B2-7 | B2-8 | B2-9 |
| Component a (parts) | Epikote 815 *1 | 92 | 92 | 92 | 92 | 92 | | | | |
| | Epikote 828 *2 | | | | | | 72 | 45 | 45 | |
| | Adeka Resin EP-4000 *3 | | | | | | 24 | 15 | 15 | |
| | Adeka Resin EPU-17 *4 | | | | | | | | | 80 |
| | γ-Glycydoxypropylmethoxysilane | | | | | 1 | | | | |
| | Aerosil #200 *5 | 8 | 3 | 5 | 5 | 7 | 4 | 5 | 5 | 5 |
| | Whiton SB Ao | | | | | | | 35 | 35 | |
| | Crown talc *6 | | | | | | | | | 15 |
| | Dibutyltin diacetate | | | | | | | | | |
| | Anion polymerization accelerator ε-Caprolactone | | 5 | | 2 | | | | | |
| | 1,2,6-Hexantolyol | | | 3 | 1 | | | | | |
| Component b (parts) | Tormide TXM 521 *7 | 92 | 92 | 92 | 92 | 92 | 85 | 54 | 54 | |
| | Epomate B-002 *8 | | | | | | | | | |
| | Adeka Hardner EH203 *9 | | | | | | | | | 48 |
| | m-Xylilenediamine | | | | | | | | | |
| | Aerosil #200 | 3 | 8 | 6 | 5 | 5 | 5 | 5 | 5 | 4.5 |
| | Whiton SB Ao *10 | | | | | | | 36 | 36 | 47 |
| | Silyl *11 | | | | | | | | | 0.5 |
| | Anion polymerization accelerator N,N-Diethyl-p-toluidine | | | | | | | | | |
| | N,N-Dimethyl-p-toluidine | 5 | | | 2 | | | | | |
| | N,N-Dimethyl-m-toluidine | | | 1 | 1 | | | | | |
| | N,N-Dimethyl-p-phenylenediamine | | | | | 3 | | | | |
| | N,N-Diethylaniline | | | | | | | | | |
| | p-Bromo-N,N-dimethylaniline | | | | | | | | | |
| | N,N-Dicyclohexylcarbodiimide | | | | | | | | 5 | |
| | Succinic acid amide | | | | | | | 5 | | 5 |
| | ε-Caprolactone | | | | | | | | | |
| | 1,2,6-Hexantolyol | | | | | | 10 | | | |
| Weight ratio of component a/component b in Adhesive (B)-2 | | 1/1 | 1/1 | 1/1 | 1/1 | 1/1 | 1/1 | 1/1 | 1/1 | 1/1 |

| | | Adhesives (B)-2 | | | | | |
|---|---|---|---|---|---|---|---|
| | | B2-10 | B2-11 | B2-12 | B2-13 | B2-14 | B2-15 |
| Component a (parts) | Epikote 815 *1 | | | | | | 92 |
| | Epikote 828 *2 | | 97 | 50 | 98 | 47 | |
| | Adeka Resin EP-4000 *3 | | | | | | |
| | Adeka Resin EPU-17 *4 | 80 | | | | | |
| | γ-Glycydoxypropylmethoxysilane | | | | | | |
| | Aerosil #200 *5 | 5 | 3 | 2 | 2 | 2 | 8 |
| | Whiton SB Ao | | | | | 48 | |
| | Crown talc *6 | 15 | | 8 | | | |
| | Dibutyltin diacetate | | | | | 3 | |
| | Anion polymerization accelerator ε-Caprolactone | | | | 40 | | |
| | 1,2,6-Hexantolyol | | | | | | |
| Component b (parts) | Tormide TXM 521 *7 | | | 50 | 65 | | 92 |
| | Epomate B-002 *8 | | 58 | | | | |
| | Adeka Hardner EH203 *9 | 48 | | | | | |
| | m-Xylilenediamine | | | | | 5 | |
| | Aerosil #200 | 5 | 3 | 5 | 5 | | 8 |
| | Whiton SB Ao *10 | 44 | 34 | 45 | 22 | | |

TABLE B2-continued

| | | B2-? | B2-? | B2-? | B2-? | B2-? | B2-? |
|---|---|---|---|---|---|---|---|
| | Silyl *11 | | | | | 95 | |
| Anion polymerization accelerator | N,N-Diethyl-p-toluidine | | | | | | |
| | N,N-Dimethyl-p-toluidine | | | | | | |
| | N,N-Dimethyl-m-toluidine | | | | | 5 | |
| | N,N-Dimethyl-p-phenylenediamine | | | | | | |
| | N,N-Diethylaniline | | | | | | |
| | p-Bromo-N,N-dimethylaniline | 3 | 5 | | | | |
| | N,N-Dicyclohexylcarbodiimide | | | | | | |
| | Succinic acid amide | | | | | | |
| | ε-Caprolactone | | | | | | 3 |
| | 1,2,6-Hexantolyol | | | | | | |
| Weight ratio of component a/component b in Adhesive (B)-2 | | 1/1 | 1/1 | 1/1 | 1/1 | 1/1 | 1/1 |

Notes for Table B2
*1: Trade name for bisphenol A epoxy resin Epikote 828 diluted with butyl glycidyl ether (epoxy equivalent: 183–193, molecular weight: about 330, viscosity: 8–11 p/25° C.), manufactured by Yuka Shell Epoxy K. K.
*2: Trade name for bisphenol A epoxy resin (epoxy equivalent: 184–194, molecular weight: about 380, viscosity: 120–150 p/25° C.), manufactured by Yuka Shell Epoxy K. K.
*3: Trade name for bisphenol A side chain type epoxy resin (epoxy equivalent: 330–360, viscosity: 30–40 p/25° C.), manufactured by Asahi Denka Kogyo K. K.
*4: Trade name for urethane-modified epoxy resin (epoxy equivalent: 215–245, viscosity 150–350 p/25° C.), manufactured by Asahi Denka Kogyo K. K.
*5: Trade name for aerosol silica, manufactured by Nippon Aerosil Company
*6: Trade name for water-containing magnesium silicate (3MgO.4SiO$_2$.H$_2$O), manufactured by Matsumura Sangyo K. K.
*7: Trade name for modified polyaminoamide epoxy resin curing agent (amine value: 270, viscosity 9 p/25° C., manufactured by Fuji Kasei Kogyo K. K.
*8: Trade name for modified amine curing agent based on a heterocyclic diamine (amine value: 327, viscosity 44 p/20° C.), manufactured by Yuka Shell Epoxy K. K.
*9: Trade name for modified polyamidamine curing agent (amine value: 250–270, viscosity: 100–200 p/25° C.), manufactured by Asahi Denka Kogyo K. K.
*10: Trade name for ground whiting, manufactured by Shiraishi Calcium K. K.
*11: Trade name for terekilic liquid oligomer having reactive silyl groups at the molecular chain terminals (average molecular weight: about 8,000, viscosity: 200 p/25° C.), manufactured by Kanegafuchi Chemical Ind. Co., Ltd.

Adhesive Preparation Examples B3-1 to B3-18

Various adhesives B3-1 to B3-18 were prepared to have various compositions as identified in Table B3.

TABLE B3

Unit: Parts by weight

| | | Adhesives (B)-3 | | | | | |
|---|---|---|---|---|---|---|---|
| | | B3-1 | B3-2 | B3-3 | B3-4 | B3-5 | B3-6 |
| Resin emulsion | #605(1) LX430(2) #1571(3) YJ2751(4) OM-28(5) | 100 | 100 | 100 | 100 | 100 | 100 |
| Anion polymerization accelerator | N,N-Dimethyl-p-toluidine | 4 | | | | | |
| | N,N-Diethyl-p-phenylenediamine | | 4 | | | | |
| | Tri-n-butylamine | | | 4 | | | |
| | Diethylcyclohexylamine | | | | 4 | | |
| | Triethanolamine | | | | | 4 | |
| | N,N-Butyldiethanolamine | | | | | | 4 |
| | N,N-Dimethylaminopropyltrimethoxysilane | | | | | | |
| | N,N-Dicyclohexylcarbodiimide | | | | | | |
| | Succinic acid amide | | | | | | |
| | Ethylenethiourea | | | | | | |
| | ε-Caprolactone | | | | | | |
| | 15-Crown-5 | | | | | | |
| | 1,2,6-Hexantolyol | | | | | | |

| | | Adhesives (B)-3 | | | | | |
|---|---|---|---|---|---|---|---|
| | | B3-7 | B3-8 | B3-9 | B3-10 | B3-11 | B3-12 |
| Resin emulsion | #605(1) LX430(2) #1571(3) YJ2751(4) OM-28(5) | 100 | 100 | 100 | 100 | 100 | 100 |
| Anion | N,N-Dimethyl- | | | | | | |

TABLE B3-continued

Unit: Parts by weight

| | | | | | | | |
|---|---|---|---|---|---|---|---|
| polymerization accelerator | p-toluidine | | | | | | |
| | N,N-Diethyl-p-phenylenediamine | | | | | | |
| | Tri-n-butylamine | | | | | | |
| | Diethycyclohexylamine | | | | | | |
| | Triethanolamine | | | | | | |
| | N,N-Butyldiethanolamine | | | | | | |
| | N,N-Dimethylaminopropyltrimethoxysilane | 4 | | | | | |
| | N,N-Dicyclohexylcarbodiimide | | 4 | | | | |
| | Succinic acid amide | | | 4 | | | |
| | Ethylenethiourea | | | | 4 | | |
| | ε-Caprolactone | | | | | 4 | |
| | 15-Crown-5 | | | | | | 4 |
| | 1,2,6-Hexantolyol | | | | | | |

| | | Adhesives (B)-3 | | | | | |
|---|---|---|---|---|---|---|---|
| | | B3-13 | B3-14 | B3-15 | B3-16 | B3-17 | B3-18 |
| Resin emulsion | #605(1) | 100 | | | | | 100 |
| | LX430(2) | | 100 | | | | |
| | #1571(3) | | | 100 | | | |
| | YJ2751(4) | | | | 100 | | |
| | OM-28(5) | | | | | 100 | |
| Anion polymerization accelerator | N,N-Dimethyl-p-toluidine | | 4 | 4 | | | |
| | N,N-Diethyl-p-phenylenediamine | | | | | | |
| | Tri-n-butylamine | | | | | | |
| | Diethycyclohexylamine | | | | | | |
| | Triethanolamine | | | | | | |
| | N,N-Butyldiethanolamine | | | | | | |
| | N,N-Dimethylaminopropyltrimethoxysilane | | | | | | |
| | N,N-Dicyclohexylcarbodiimide | | | | 4 | 4 | |
| | Succinic acid amide | | | | | | |
| | Ethylenethiourea | | | | | | |
| | ε-Caprolactone | | | | | | |
| | 15-Crown-5 | | | | | | |
| | 1,2,6-Hexantolyol | 4 | | | | | |

Notes for Table B3:
(1) Trade name for vinyl acetate resin emulsion adhesive, manufactured by Cemedine Co., Ltd.
(2) Trade name for carboxyl-modified styrene-butadiene copolymer emulsion, manufactured by Nihon Zeone K.K.
(3) Trade name for carboxyl-modified acrylonitrile-butadiene copolymer emulsion, manufactured by Nihon Zeone K.K.
(4) Trade name for styrene-alkyl methacrylate-alkyl acrylate copolymer emulsion, manufactured by Mitsubishi Yuka Badische K.K.
(5) Trade name for ethylene-vinyl acetate copolymer emulsion, manufactured by Kabushiki Kaisha Kurare

Example 1-1 to 1-29, and Comparative Examples 1-1 to 1-4

Bonding tests were conducted by using various adhesives prepared in the foregoing Adhesive Preparation Examples as identified in Tables A and B-1 in various combination as shown in Table 1. The modes of the application of the adhesives were as identified Table 1. The testing methods were as follows.

(1) Setting time (time for provisional adhesion)

Two sheets of plywood (100 mm in length × 25 mm in width × 3 mm in thickness) were used. The adhesives shown in Table 1 were applied in the mode as identified in Table 1, and the two sheets were immediately bonded (the overlapping surface area of the two sheets was 25 mm × 25 mm), whereupon the time required to bear a static load of 1 kg was measured and taken as the setting time (the time for provisional adhesion).

(2) Impact resistance

Two sheets of soft steel (100 mm in length × 25 mm in width × 1.6 mm in thickness) were used. The adhesives shown in Table 1, were applied in the mode as identified in Table 1, and the two sheets were immediately bonded crosswisely (the overlapping area of the two sheets was 25 mm × 25 mm). The bonded product was left to stand at 20° C. for 7 days for aging, and then dropped from a height of 2 m to a concrete surface, whereby peeling or non-peeling was observed. The evaluation was made in accordance with the following standards.

: No peeling was observed when the dropping test was repeated five times

X: No peeling was observed by a single dropping test.

(3) Peel tests

Two sheets of soft steel (200 mm in length × 25 mm in width × 0.5 mm in thickness) were used. The adhesives shown in Table 1 were applied in the mode as identified in Table 1, and the two sheets were bonded immediately (the overlapping surface area of the two sheets was 170 mm×25 mm). The bonded product was left to stand at 20° C. for 7 days for aging, whereupon peel strength was measured.

time for provisional adhesion was short at a level of 10 seconds.

In a case where the bonding was carried out by using the adhesive (A) alone (Comparative Example 1-3), a relatively long period of time (240 seconds) was required for the provisional adhesion, and the impact

TABLE 1

Figure 1:
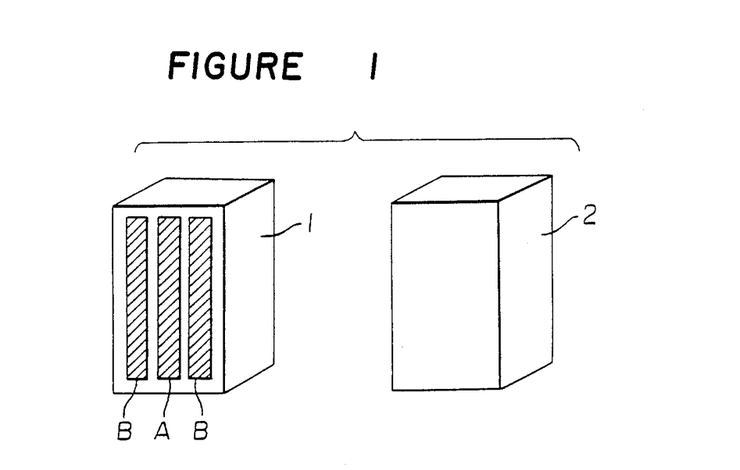
FIGS. 1 to 9 illustrate various modes of the application of the adhesives (A) and (B) for carrying out the bonding method of the present invention, wherein reference numerals 1 and 2 represent two objects to be bonded to each other.
Figure 2:
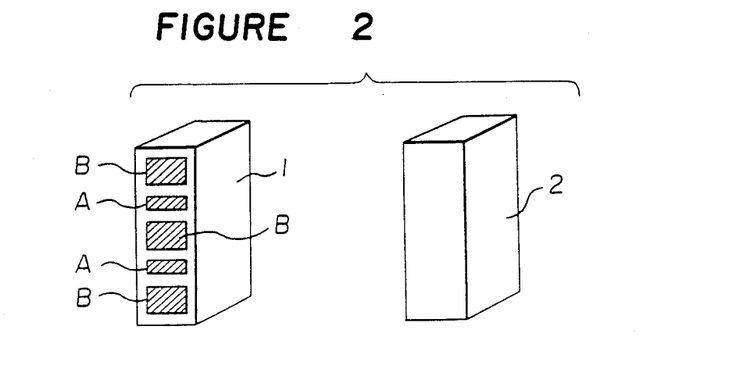
Figure 3:
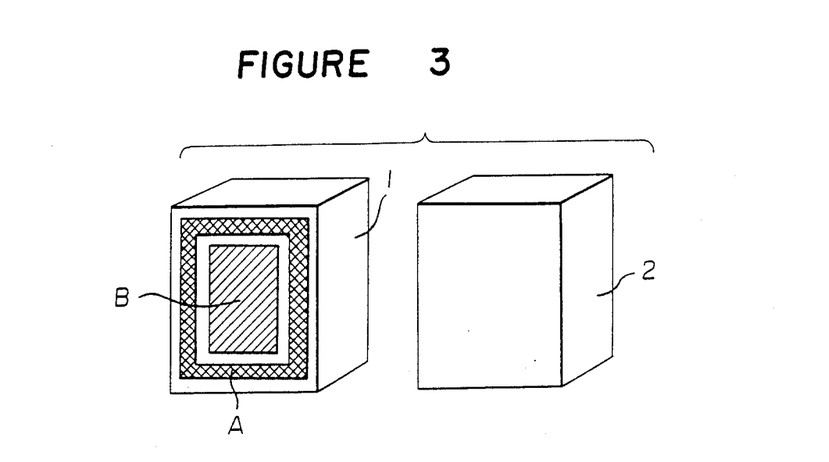
Figure 4:
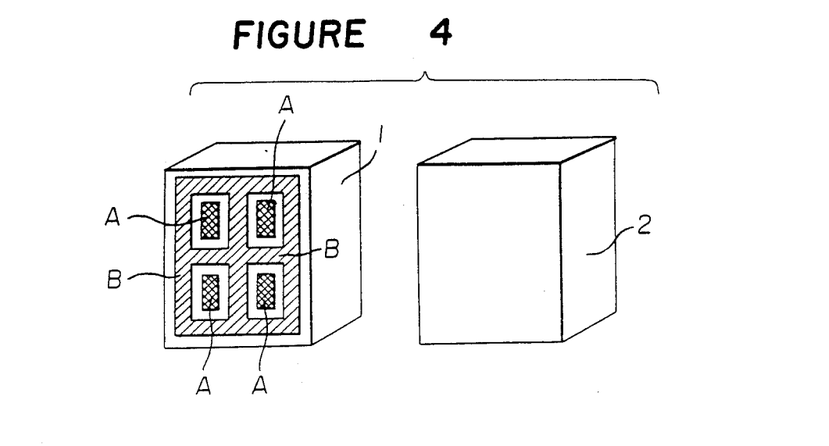
Figure 5:
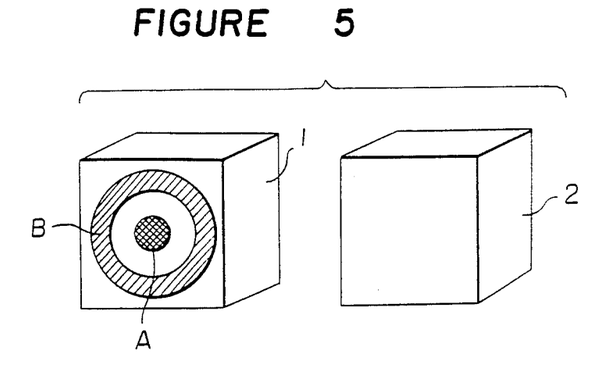

| Example Nos. | Adhesives used (A) | (B)-1 | Application mode of adhesive | Setting time | Impact resistance | Peel strength (kgf/25 mm) |
|---|---|---|---|---|---|---|
| Ex. 1-1 | A1 | B1-1 | FIG. 1 *1 | 10 sec. | O | 4.7 |
| Ex. 1-2 | " | B1-2 | " | " | " | 4.5 |
| Ex. 1-3 | " | B1-3 | " | 20 sec. | " | 4.4 |
| Ex. 1-4 | A2 | B1-1 | " | 10 sec. | " | 4.8 |
| Ex. 1-5 | " | B1-2 | " | " | " | 4.6 |
| Ex. 1-6 | " | B1-3 | " | 20 sec. | " | 4.6 |
| Ex. 1-7 | " | B1-4 | " | 10 sec. | " | 5.0 |
| Ex. 1-8 | " | B1-5 | " | 20 sec. | " | 5.0 |
| Ex. 1-9 | " | B1-6 | " | 10 sec. | " | 4.5 |
| Ex. 1-10 | " | B1-7 | " | " | " | 4.0 |
| Ex. 1-11 | " | B1-8 | " | " | " | 4.2 |
| Ex. 1-12 | " | B1-9 | " | " | " | 6.2 |
| Ex. 1-13 | " | B1-10 | " | " | " | 6.2 |
| Ex. 1-14 | " | B1-11 | " | " | " | 5.6 |
| Ex. 1-15 | " | B1-12 | " | 30 sec. | " | 5.6 |
| Ex. 1-16 | " | B1-13 | " | 10 sec. | " | 5.5 |
| Ex. 1-17 | " | B1-14 | " | 50 sec. | " | 4.5 |
| Com. Ex. 1-1 | A2 | B1-15 | " | 120 sec. | O | 4.0 |
| Com. Ex. 1-2 | " | B1-16 | " | 10 sec. | X | 0.1 |
| Com. Ex. 1-3 | A6 | Nil | " | 240 sec. | X | 0.2 |
| Ex. 1-18 | A3 | B1-3 | FIG. 1 *1 | 30 sec. | O | 4.5 |
| Ex. 1-19 | A4 | B1-4 | " | 50 sec. | " | 5.0 |
| Ex. 1-20 | A5 | B1-5 | " | " | " | 5.0 |
| Ex. 1-21 | A6 | B1-6 | " | 20 sec. | " | 4.6 |
| Com. Ex. 1-4 | Nil | B1-3 | " | 1.5 hrs | " | 4.5 |
| Ex. 1-22 | A2 | B1-1 | FIG. 2 *2 | 10 sec. | " | 4.6 |
| Ex. 1-23 | " | " | FIG. 3 *3 | " | " | 4.8 |
| Ex. 1-24 | " | " | FIG. 4 *4 | " | " | 5.0 |
| Ex. 1-25 | " | " | FIG. 5 *5 | " | " | 4.6 |
| Ex. 1-26 | " | " | FIG. 6 *6 | " | " | 4.6 |
| Ex. 1-27 | " | " | FIG. 7 *7 | " | " | 4.8 |
| Ex. 1-28 | " | " | FIG. 8 *8 | " | " | 5.0 |
| Ex. 1-29 | " | " | FIG. 9 *9 | " | " | 4.4 |

Note for Table 1:
The total surface areas (mm² coated with the adhesives (A) and (B)-1) in various application modes as shown in the Figures were as follows.

| Application modes | | | *1 | *2 | *3 | *4 | *5 | *6 | *7 | *8 | *9 |
|---|---|---|---|---|---|---|---|---|---|---|---|
| Setting time Impact resistance | Total coated surface area | (A) | 80 | 80 | 170 | 40 | 50 | 110 | 120 | 80 | 230 |
| | | (B)-1 | 280 | 240 | 290 | 380 | 200 | 290 | 300 | 140 | 400 |
| Peel strength | Total coated surface area | (A) | 640 | 640 | 760 | 390 | 590 | 840 | 600 | 200 | 1050 |
| | | (B)-1 | 2240 | 1920 | 2640 | 2880 | 1690 | 2520 | 2480 | 1800 | 3200 |

It is evident from the results of Table 1 that in each Example, provisional adhesion was attained in a remarkably short period of time, and the bonding was superior in both the impact resistance and peel strength.

Whereas, in a case where instead of the adhesive (B)-1, a room temperature moisture-curing adhesive was used without an addition of the anion polymerization accelerator (Comparative Example 1-1), a relatively long period of time (120 seconds) was required for the provisional adhesion).

Further, in a case where instead of the adhesive (B)-1, the anion polymerization curing agent was used alone (Comparative Example 1-2), the bonding was very poor in the impact resistance and peel strength, although the resistance and peel strength were inferior.

In a case where the bonding was carried out by using the adhesive (B)-1 alone (Comparative Example 1-4), it took 1 hour and 30 minutes for the provisional adhesion.

Examples 2-1 to 2-26 and Comparative Examples 2-1 to 2-4

Bonding tests were conducted by using various adhesives prepared in the above Adhesive Preparation Examples A1 to A6 and B2-1 to B2-15 in various combinations as identified in Table 2. The modes of the application of the adhesives were as identified Table 2. The testing methods were as described above.

TABLE 2

| Example Nos. | Adhesives used (A) | Adhesives used (B)-2 | Application mode of adhesive Note 3 | Setting time | Impact resistance | Peel strength (kgf/25 mm) |
|---|---|---|---|---|---|---|
| Ex. 2-1 | A1 | B2-1 | FIG. 1 *1 | 10 sec. | O | 4.5 |
| Ex. 2-2 | " | B2-2 | " | 20 sec. | " | 4.7 |
| Ex. 2-3 | " | B2-3 | " | " | " | 4.5 |
| Ex. 2-4 | " | B2-4 | " | 10 sec. | " | 4.3 |
| Ex. 2-5 | " | B2-5 | " | " | " | 4.5 |
| Ex. 2-6 | A2 | B2-6 | " | 30 sec. | " | 3.6 |
| Ex. 2-7 | " | B2-7 | " | " | " | 4.2 |
| Ex. 2-8 | " | B2-8 | " | 10 sec. | " | 4.1 |
| Ex. 2-9 | " | B2-9 | " | 50 sec. | " | 6.5 |
| Ex. 2-10 | " | B2-10 | " | 10 sec. | " | 5.9 |
| Ex. 2-11 | " | B2-11 | " | 20 sec. | " | 1.8 |
| Ex. 2-12 | " | B2-12 | " | 10 sec. | " | 4.1 |
| Ex. 2-13 | " | B2-13 | " | 30 sec. | " | 2.7 |
| Ex. 2-14 | " | B2-14 | " | 10 sec. | " | 8.3 |
| Com. Ex. 2-1 | " | Note 1 | " | " | X | 0.1 |
| Com. Ex. 2-2 | A6 | Nil | " | 240 sec. | " | 0.2 |
| Com. Ex. 2-3 | Nil | B2-1 | " | About 8 hrs | O | 4.8 |
| Com. Ex. 2-4 | Note 2 | B2-15 | " | About 8 hrs | O | 4.6 |
| Ex. 2-15 | A3 | B2-2 | " | 30 sec. | O | 4.8 |
| Ex. 2-16 | A4 | B2-3 | FIG. 1 *1 | 50 sec. | O | 4.5 |
| Ex. 2-17 | A5 | B2-4 | " | " | " | 4.3 |
| Ex. 2-18 | A6 | B2-5 | " | 20 sec. | " | 4.5 |
| Ex. 2-19 | A2 | B2-1 | FIG. 2 *2 | 10 sec. | " | 4.4 |
| Ex. 2-20 | " | " | FIG. 3 *3 | " | " | 4.6 |
| Ex. 2-21 | " | " | FIG. 4 *4 | " | " | 4.8 |
| Ex. 2-22 | " | " | FIG. 5 *5 | " | " | 4.3 |
| Ex. 2-23 | " | " | FIG. 6 *6 | " | " | " |
| Ex. 2-24 | " | " | FIG. 7 *7 | " | " | 4.6 |
| Ex. 2-25 | " | " | FIG. 8 *8 | " | " | 4.8 |
| Ex. 2-26 | " | " | FIG. 9 *9 | " | " | 4.2 |

Notes for Table 2:

Note 1: In Comparative Example 2-1, instead of the adhesive (B)-2, the anion polymerization accelerator (N,N-diethyl-p-toluidine) was used alone in an amount of 100 parts.

Note 2: It was attempted to use a mixture of 100 parts of ethyl α-cyanoacrylate (A2) and 3 parts of the anion polymerization accelerator (N,N-dimethyl-p-toluidine), instead of the adhesive (A), but the mixture immediately underwent gelation. Namely, when an aromatic tertiary amine compound was added as an anion polymerization accelerator to the adhesive (A), the storage stability is impaired. Therefore, the results of Comparative Example 2-4 was the same as the case where the bonding was carried out by using adhesive B2-15 alone.

Note 3: The total surface areas (mm$^2$) coated with the adhesives (A) and (B)-2 in various application modes, *1 to *9 as shown in the Figures, were as shown in the following Table.

| Application mode | | | *1 | *2 | *3 | *4 | *5 | *6 | *7 | *8 | *9 |
|---|---|---|---|---|---|---|---|---|---|---|---|
| Setting time | Total coated surface area | (A) | 80 | 80 | 170 | 40 | 50 | 110 | 120 | 80 | 230 |
| Impact resistance | | (B)-2 | 280 | 240 | 290 | 380 | 200 | 290 | 300 | 140 | 400 |
| Peel strength | Total coated surface area | (A) | 640 | 640 | 760 | 390 | 590 | 840 | 600 | 200 | 1050 |
| | | (B)-2 | 2240 | 1920 | 2640 | 2880 | 1690 | 2520 | 2480 | 1800 | 3200 |

It is evident from the results of Table 2 that in each Example, the provisional adhesion was attained in a remarkably short period of time, and the bonding was excellent in the impact resistance and peel strength.

Whereas, in a case where instead of the adhesive (B)-2, the anion polymerization accelerator was used alone (Comparative Example 2-1), the bonding was very poor in the impact resistance and peel strength, although the time required for the provisional adhesion was short at a level of 10 seconds.

In a case where the adhesive (A) was used alone (Comparative Example 2-2), a relatively long period of time (240 seconds) was required for the provisional adhesion, and the impact resistance and peel strength of the bonding were inferior.

In a case where a room temperature curing two-part type epoxy resin adhesive (B)-2 was used alone for the bonding (Comparative Example 2-3), it took about 8 hours for the provisional adhesion.

Further, in a case where the anion polymerization accelerator was added to the room temperature anion polymerization curing adhesive (A) and no anion polymerization accelerator was added to the adhesive (B), (Comparative Example 2-4), gelation took place immediately upon the addition of the anion polymerization accelerator to the adhesive (A), and it was impossible to apply the adhesive (A) to the object. Therefore, in Comparative Example 2-4, the bonding was conducted by the adhesive (B)-2 only.

Examples 3-1 to 3-29, and Comparative Examples 3-1 and 3-2

Bonding tests were carried out by using various adhesives prepared in the above Adhesive Preparation Examples A1 to A6 and B3-1 to B3-18 in various combinations as identified in Table 3. The application modes of the adhesives were as shown in Table 3. The testing methods were as described above.

TABLE 3

| Example Nos. | Adhesives used (A) | (B)-3 | Application mode of adhesive Note 3 | Setting time |
|---|---|---|---|---|
| Ex. 3-1 | A1 | B3-1 | FIG. 1 *1 | 10 sec. |
| Ex. 3-2 | " | B3-2 | " | " |
| Ex. 3-3 | " | B3-3 | " | 30 sec. |
| Ex. 3-4 | " | B3-4 | " | 10 sec. |
| Ex. 3-5 | A2 | B3-5 | " | 30 sec. |
| Ex. 3-6 | " | B3-6 | " | 10 sec. |
| Ex. 3-7 | " | B3-7 | " | " |
| Ex. 3-8 | " | B3-8 | " | " |
| Ex. 3-9 | " | B3-9 | " | 60 sec. |
| Ex. 3-10 | " | B3-10 | " | 10 sec. |
| Ex. 3-11 | " | B3-11 | " | 60 sec. |
| Ex. 3-12 | " | B3-12 | " | " |
| Ex. 3-13 | " | B3-13 | " | " |
| Ex. 3-14 | " | B3-14 | " | 10 sec. |
| Ex. 3-15 | " | B3-15 | " | " |
| Ex. 3-16 | " | B3-16 | " | " |
| Ex. 3-17 | " | B3-17 | " | " |
| Com. Ex. 3-1 | Nil | B3-18 | " | 240 sec. |
| Com. Ex. 3-2 | A6 | Nil | " | " |
| Ex. 3-18 | A3 | B3-1 | " | 20 sec. |
| Ex. 3-19 | A4 | B3-1 | FIG. 1 *1 | 30 sec. |
| Ex. 3-20 | A5 | B3-1 | " | 30 sec. |
| Ex. 3-21 | A6 | B3-1 | " | 10 sec. |
| Ex. 3-22 | " | B3-1 | FIG. 2 *2 | 10 sec. |
| Ex. 3-23 | " | B3-1 | FIG. 3 *3 | 10 sec. |
| Ex. 3-24 | " | B3-1 | FIG. 4 *4 | 10 sec. |
| Ex. 3-25 | " | B3-1 | FIG. 5 *5 | 10 sec. |
| Ex. 3-26 | " | B3-1 | FIG. 6 *6 | 10 sec. |
| Ex. 3-27 | " | B3-1 | FIG. 7 *7 | 10 sec. |
| Ex. 3-28 | " | B3-1 | FIG. 8 *8 | 10 sec. |
| Ex. 3-29 | " | B3-1 | FIG. 9 *9 | 10 sec. |

| Appplication mode | | | *1 | *2 | *3 | *4 | *5 | *6 |
|---|---|---|---|---|---|---|---|---|
| setting time impact resistance | Total coated surface area | (A) | 80 | 80 | 170 | 40 | 50 | 110 |
| | | (B)-3 | 280 | 240 | 290 | 380 | 200 | 290 |

| Application mode | | | *7 | *8 | *9 |
|---|---|---|---|---|---|
| setting time impact resistance | Total coated surface area | (A) | 120 | 80 | 230 |
| | | (B)-3 | 300 | 140 | 400 |

Note for Table 3:
The total surface areas (mm²) coated with the adhesives (A) and (B)-3 in various application modes as shown in the Figures, were as follows.

It is evident from results of Table 3 that in each Example, the provisional adhesion was attained in a remarkably short period of time.

Whereas, in the case where the bonding was conducted by using the synthetic resin aqueous emulsion adhesive alone (Comparative Example 3-1), it took a long period of time for the provisional adhesion.

Also in a case where the bonding was conducted by using the adhesive (A) alone (Comparative Example 3-2), it took a long period of time for the provisional adhesion as in the case where the synthetic resin aqueous emulsion adhesive was used alone.

As described in the foregoing, according to the method of the present invention, the provisional adhesion can be attained in an extremely short period of time without requiring any special tools, as the adhesive (A) cures quickly by the action of the anion polymerization accelerator incorporated in the adhesive (B). Besides, upon expiration of a certain period of time, the room temperature self-curing adhesive (B) cures to establish excellent bonding properties, such as excellent water resistance, peel resistance, impact resistance and heat and aging resistance.

Further, the method of the present invention is effective not only for the bonding of ordinary objects but also for the bonding of porous objects such as fibrous objects or objects having a roughened surface, since the adhesive (B)-1 reacts stoichiometrically with water such as a moisture in the air and cures, or the adhesive (B)-2 reacts stoichiometrically and cures, or the adhesive (B)-3 forms a bonding layer upon evaporation of water therefrom.

What is claimed is:

1. A room temperature self-curing adhesive containing from 0.05 to 50% by weight of an anion polymerization accelerator, said self-curing adhesive being a room temperature moisture-curing adhesive consisting essentially of an organic silicon compound having in its molecule at least two reactive silicon functional groups of the formula:

where Z is a hydrolyzable group selected from the group consisting of an acyloxy group, a ketoxime group, an alkoxy group, an alkenyloxy group, an amino group, an aminoxy group, and an amide group, $R^4$ is a non-hydrolyzable group selected from the group consisting of an alkyl group, a cycloalkyl group, an alkenyl group, an aryl group, an aralkyl group and an iminoalkyl group, which groups are unsubstituted or substituted by halogen, an n is an integer of from 0 to 2, and wherein the anion polymerization accelerator is an aromatic tertiary amine compound of the formula:

wherein each $R^4$ and $R^5$, which may be the same or different, is an alkyl group having from 1 to 3 carbon atoms, X is an alkyl group having from 1 to 17 carbon atoms, a phenyl group a cyclohexyl group, an amino group, a halogen atom, a hydroxyl group or an alkoxy group having from 1 to 4 carbon atoms, and n is 0, 1, 2 or 3, provided that when n is 2 or 3 the plurality of X may be the same or different.

2. The room temperature self-curing adhesive according to claim 1, wherein the anion polymerization accelerator is N, N-dimethyl-p-toluidine, N,N-diethyl-p-toluidine, N,N-dimethyl-m-toluidine, N,N-diethyl-m-toluidine, or mixture thereof.

3. The room temperature self-curing adhesive according to claim 1, wherein the room temperature moisture-curing adhesive contains from 0.5 to 40% by weight of the anion polymerization accelerator.

* * * * *

UNITED STATES PATENT AND TRADEMARK OFFICE
CERTIFICATE OF CORRECTION

PATENT NO. : 4,950,701

DATED : Aug. 21, 1990

INVENTOR(S) : Naomi OKAMURA, et al.

It is certified that error appears in the above-identified patent and that said Letters Patent is hereby corrected as shown below:

ON THE TITLE PAGE

The Foreign Application Priority Data has been omitted. It should appear as follows:

Jul.  2, 1986  [JP]  Japan........................61-154154
Nov.  6, 1986  [JP]  Japan........................61-262700
Nov. 17, 1986  [JP]  Japan........................61-271719

Signed and Sealed this

Tenth Day of December, 1991

Attest:

HARRY F. MANBECK, JR.

*Attesting Officer*    *Commissioner of Patents and Trademarks*